US009975047B2

(12) United States Patent
Hamano et al.

(10) Patent No.: US 9,975,047 B2
(45) Date of Patent: May 22, 2018

(54) GAME PROGRAM, GAME METHOD, AND GAME SYSTEM

(71) Applicant: KONAMI DIGITAL ENTERTAINMENT CO., LTD., Tokyo (JP)

(72) Inventors: Takashi Hamano, Tokyo (JP); Osamu Migitera, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 54 days.

(21) Appl. No.: 15/061,432

(22) Filed: Mar. 4, 2016

(65) Prior Publication Data

US 2016/0184709 A1 Jun. 30, 2016

Related U.S. Application Data

(63) Continuation-in-part of application No. PCT/JP2014/073480, filed on Sep. 5, 2014.

(30) Foreign Application Priority Data

Sep. 6, 2013 (JP) .................................. 2013-185551

(51) Int. Cl.
  *A63F 13/44* (2014.01)
  *A63F 13/46* (2014.01)
  (Continued)

(52) U.S. Cl.
  CPC ............ *A63F 13/537* (2014.09); *A63F 13/44* (2014.09); *A63F 13/46* (2014.09); *A63F 13/577* (2014.09); *A63F 13/814* (2014.09)

(58) Field of Classification Search
  None
  See application file for complete search history.

(56) References Cited

U.S. PATENT DOCUMENTS

2012/0071241 A1   3/2012   O
2013/0109471 A1   5/2013   Yamamoto

FOREIGN PATENT DOCUMENTS

JP   2007097861 A   4/2007
JP   2008-200295 A   9/2008
(Continued)

OTHER PUBLICATIONS

Reflec Beat + Review, Toucharcade—Konami's Rhythm Battle Air Hockey—http://toucharcade.com/2012/11/12/reflec-beat-review/—Nov. 12, 2012.*
(Continued)

*Primary Examiner* — Damon Pierce
(74) *Attorney, Agent, or Firm* — Sughrue Mion, PLLC

(57) ABSTRACT

A game method includes making an output control to move at least one object displayed over a display screen toward a predefined area of the display screen; making, for each of the at least one object, a first success/failure determination, based on first and second timings, wherein at the first timing the object moving over the display screen reaches the predefined area of the display screen, and at the second timing the acceptor accepts the inputs; and making, for each of the at least one object, a second success/failure determination, based on motions of the object, depending on a type of operation that the acceptor determined from the inputs that the acceptor has accepted, in a case that a result of the first success/failure determination represents success.

8 Claims, 8 Drawing Sheets

(51) Int. Cl.
*A63F 13/537* (2014.01)
*A63F 13/814* (2014.01)
*A63F 13/577* (2014.01)

(56) References Cited

FOREIGN PATENT DOCUMENTS

| | | |
|---|---|---|
| JP | 2011-161042 A | 8/2011 |
| JP | 2014-012138 A | 1/2014 |
| JP | 2014-171725 A | 9/2014 |
| KR | 10-2009-0113754 A | 11/2009 |
| KR | 10-1063283 B1 | 9/2011 |
| KR | 101073790 B1 | 10/2011 |
| KR | 1020120132499 A | 12/2012 |
| WO | 2013/024771 A1 | 11/1917 |
| WO | 2013/118377 A1 | 8/2013 |

OTHER PUBLICATIONS

Communication dated Sep. 20, 2016, issued by the Korean Intellectual Property Office in corresponding Korean Application No. 10-2016-7000770.
Internet blog, "ShadowBreak, the game with the action in the brick breaking", Jul. 1, 2012 (5 pages total).
"Reflec Beat Plus (iOS App Overview)", Nov. 23, 2011, URL: [https://www.youtube.coin/watcli?v=YawzOldyqOw] (9 pages total).
It swings by Flick! Intently.[home run] Batting game Flick Home Run! to aim at, APPiOS, May 11, 2012, [online], retrieved on Oct. 24, 2017, total 3 pages, URL: http://appios.net/phone-apps/flick-home-run/.
Communication dated Oct. 31, 2017, from Korean Intellectual Property Office in counterpart application No. 10-2017-7017840.
Communication dated Nov. 7, 2017, from Japanese Patent Office in counterpart application No. 2017-132972.
Communication dated Mar. 13, 2018 from the Japanese Patent Office in counterpart application No. 2017-132972.

* cited by examiner

GAME PROGRAM, GAME METHOD, AND GAME SYSTEM

TECHNICAL FIELDS

The disclosure generally relates to a game program, a game method, and a game system.

BACKGROUND

Timing games are provided in which a determination is made regarding the success or failure of a prescribed operation input from a user playing the game at a timing that matches an object operated within a screen. For example, Japanese Patent Application Publication No. 2008-200295 describes a timing game in which an object moving in conjunction with the procession of a melody is displayed on a screen and, if an operation is made at the time of the object reaching a prescribed position on the screen, the user is granted points.

Since the above-described timing game grants points in accordance with only whether or not an operation is made at a prescribed time, it can be thought that the game might become monotonous. For this reason, there are cases in which it is desirable to add new game elements to such a timing game to enhance the enjoyment of the game.

SUMMARY

A game program product includes a non-transitory computer-readable medium, and a computer program stored in the non-transitory computer-readable medium. The computer program is, when executed by a computer of a game system including an acceptor configured to accept inputs by operations, to cause the computer to at least: make an output control to move at least one object displayed over a display screen toward a predefined area of the display screen; make, for each of the at least one object, a first success/failure determination, based on first and second timings, wherein at the first timing the object moving over the display screen reaches the predefined area of the display screen, and at the second timing the acceptor accepts the inputs; and make, for each of the at least one object, a second success/failure determination, based on motions of the object, depending on a type of operation that the acceptor determined from the inputs that the acceptor has accepted, in a case that a result of the first success/failure determination represents success.

DETAILED DESCRIPTIONS

Embodiments

Figure 1:
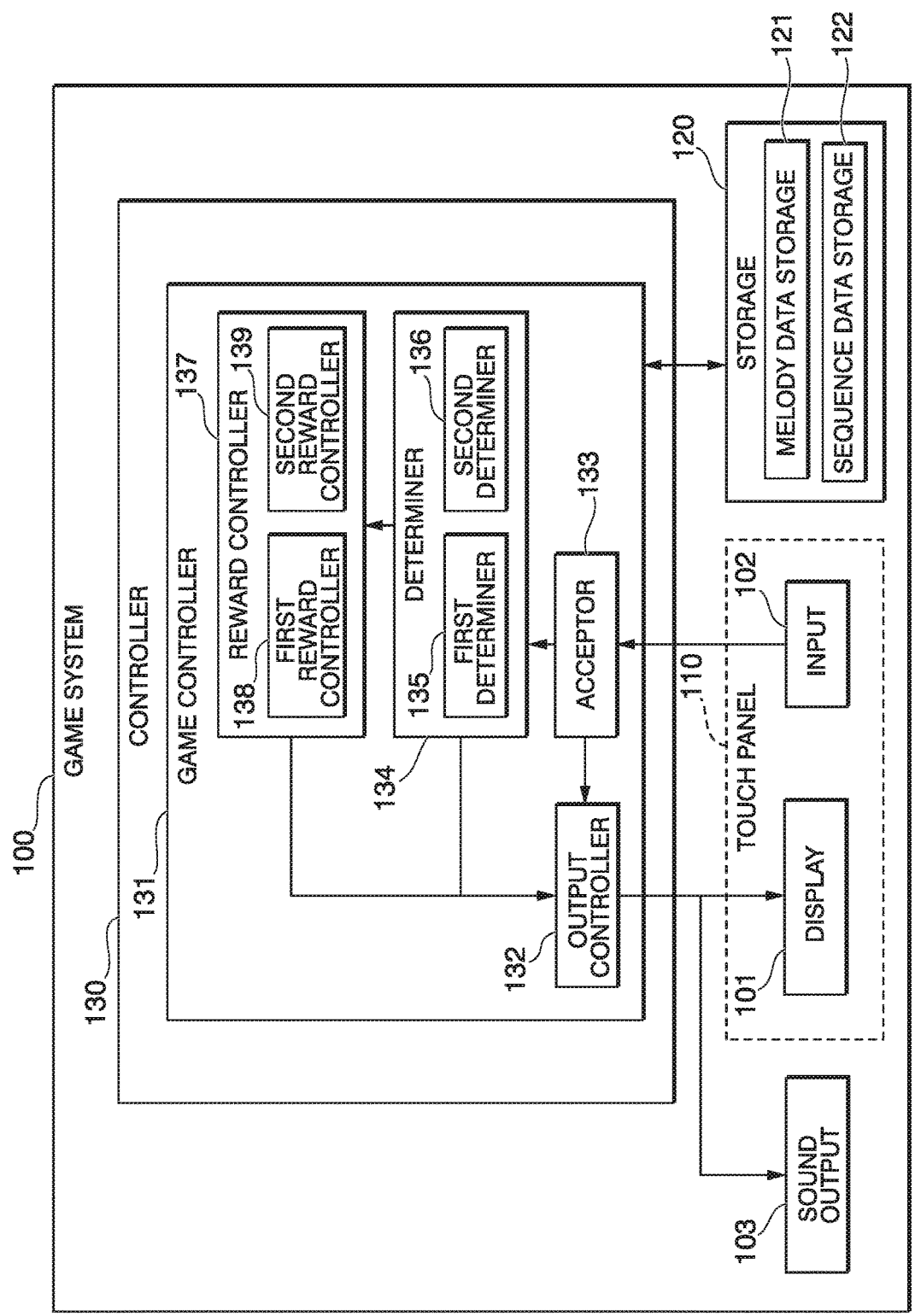
FIG. 1 is a block diagram showing the constitution of a game system 100 according to the present embodiment.

Embodiments of the present invention will be described below, with references made to the drawings.

In some embodiment, a game program product may include, but is not limited to: a non-transitory computer-readable medium, and a computer program stored in the non-transitory computer-readable medium, the computer program is, when executed by a computer of a game system including an acceptor configured to accept inputs by operations, to cause the computer to at least: make an output control to move at least one object displayed over a display screen toward a predefined area of the display screen; make, for each of the at least one object, a first success/failure determination, based on first and second timings, wherein at the first timing the object moving over the display screen reaches the predefined area of the display screen, and at the second timing the acceptor accepts the inputs; and make, for each of the at least one object, a second success/failure determination, based on motions of the object, depending on a type of operation that the acceptor determined from the inputs that the acceptor has accepted, in a case that a result of the first success/failure determination represents success.

In some cases, the computer program is to cause the computer to further: display at least one target on the display screen; and determine reward, on the basis of whether each of the at least object, which moved in a direction according to the inputs that the acceptor accepted at the second timing collides the at least one target, in a case that the result of the first success/failure determination represents success.

In some cases, the output control may include, but is not limited to, displaying a game character releasing the at least one object on the display screen; and moving the at least one object released from the game character toward the predefined area of the display screen.

In some cases, the game system may include, but is not limited to, a sequence data storage that stores sequence data describing the first timing. The at least one object is a plurality of objects. The output control may include, but is not limited to, determining, for each of the plurality of objects, the first timing on the basis of sequence data describing the first timing, where the first timing is in a period of time which is defined from a first time to a second time later than the first time; displaying, on the display screen, the plurality of objects, in correspondence with the first timing respectively determined for each of the plurality of objects; arranging, time-sequentially on a predefined route in the display screen, plural pairs of the object and a first time indicator, the first time indicator representing the predefined area of the display screen and corresponding to the first time; and for guiding the first timing, generating, on the predefined route, a relative displacement between the object and the first time indicator of each pair so that a distance between the object and the first time indicator of each pair decreases, depending on decreasing a time difference between the first time and the first timing respectively determined for each of the plurality of objects.

In some cases, the computer program is to cause the computer to further: determine reward, on the basis of results of the first success/failure determination and the second success/failure determination.

In some cases, the game system may include, but is not limited to, a sequence data storage that stores sequence data describing the first timing, wherein the output control may include, but is not limited to, displaying the object that moves on the predefined route to an indicator so that the object reaches the indicator at the first timing in case that it is determined that it approaches the first timing which is described in the sequence data.

In another embodiment, a game program product may include, but is not limited to, a non-transitory computer-readable medium, and a computer program stored in the non-transitory computer-readable medium, the computer program being, when executed by a computer of a game system including an acceptor configured to accept inputs by operations, to cause the computer to at least: make, for each of at least one object, a first success/failure determination, based on first and second timings, wherein at the second timing the acceptor accepts the inputs; and make, for each of the at least one object, a second success/failure determination, based on motions of the object, depending on a type of operation that the acceptor determined from the inputs that the acceptor has accepted, in a case that a result of the first success/failure determination represents success.

In yet another embodiment, a game program product may include, but is not limited to, a non-transitory computer-readable medium, and a computer program stored in the non-transitory computer-readable medium, the computer program being, when executed by a computer, to cause the computer to at least: display, on a display screen, a game character releasing at least one object; move the at least one object to a predefined area of the display screen; and make, for each of the at least one object, a success/failure determination, based on first and second timings, wherein at the first timing the object moving over the display screen reaches the predefined area of the display screen, and at the second timing the computer accepts input.

In still another embodiment, a game method is performed by one or more computers. The method may include, but is not limited to, making an output control to move at least one object displayed over a display screen toward a predefined area of a display screen; making, for each of the at least one object, a first success/failure determination, based on first and second timings, wherein at the first timing the object moving over the display screen reaches the predefined area of the display screen, and at the second timing the computer accepts the inputs; and making, for each of the at least one object, a second success/failure determination, based on motions of the object, depending on a type of operation that the computer determined from the inputs that the computer has accepted, in a case that a result of the first success/failure determination represents success.

In still another embodiment, a game method is performed by one or more computers. The method may include, but is not limited to, making, for each of at least one object, a first success/failure determination, based on first and second timings, wherein at the second timing the computer accepts the inputs; and making, for each of the at least one object, a second success/failure determination, based on motions of the object, depending on a type of operation that the computer determined from the inputs that the computer has accepted, in a case that a result of the first success/failure determination represents success.

In still another embodiment, a game method is performed by one or more computers. The method may include, but is not limited to, displaying, on a display screen, a game character releasing at least one object; moving the at least one object to a predefined area of the display screen; and making for each of the at least one object, a success/failure determination, based on first and second timings, wherein at the first timing the object moving over the display screen reaches the predefined area of the display screen, and at the second timing the computer accepts input.

In still another embodiment, a game system may include, but is not limited to, one or more hardware processors configured to execute one or more software components and to perform at least: making an output control to move at least one object displayed over a display screen toward a predefined area of a display screen; making, for each of the at least one object, a first success/failure determination, based on first and second timings, wherein at the first timing the object moving over the display screen reaches the predefined area of the display screen, and at the second timing the computer accepts the inputs; and making, for each of the at least one object, a second success/failure determination, based on motions of the object, depending on a type of operation that the computer determined from the inputs that the computer has accepted, in a case that a result of the first success/failure determination represents success.

In still another embodiment, a game system may include, but is not limited to, a game system may include, but is not limited to, one or more hardware processors configured to execute one or more software components and to perform at least: making, for each of at least one object, a first success/failure determination, based on first and second timings, wherein at the second timing the computer accepts the inputs; and making, for each of the at least one object, a second success/failure determination, based on motions of the object, depending on a type of operation that the computer determined from the inputs that the computer has accepted, in a case that a result of the first success/failure determination represents success.

In still another embodiment, a game system may include, but is not limited to, one or more hardware processors configured to execute one or more software components and to perform at least: displaying, on a display screen, a game character releasing at least one object; moving, by a computer, the at least one object to a predefined area of the display screen; and making, for each of the at least one object, a success/failure determination, based on first and second timings, wherein at the first timing the object moving over the display screen reaches the predefined area of the display screen, and at the second timing the computer accepts input.

First Embodiment

FIG. 1 is a block diagram showing the constitution of a game system 100 according to the present embodiment. The arrows in FIG. 1 indicate the main flow of information. The game system 100 is a terminal with which a user plays a game, and includes, for example, a computer of a mobile telephone handset, such as a smartphone, a personal computer, a tablet personal computer, and a home or arcade game machine. In the present embodiment, the game system 100 will be described as being a smartphone. The game system 100 has a display 101, an input 102, a sound output 103, a storage 120, and a control unit 130.

The display unit 101 is a display device having a screen that displays information such as images and characters.

The input unit 102 is an input device that generates an input signal in response to an operation by a user. For example, the input unit 102 is a keyboard or buttons, a mouse, or a touch panel or the like. In the present embodiment, the example described is one in which a touch panel 110 on which the user makes operations integrates the display unit 101 and the input unit 102 as one. The operating method of the touch panel 110 may be any one of a resistive film type, a surface acoustic wave type, near-infrared type, electromagnetic induction type, and capacitive type, or the like.

The sound output 103 is a speaker that outputs sound.

Figure 2:
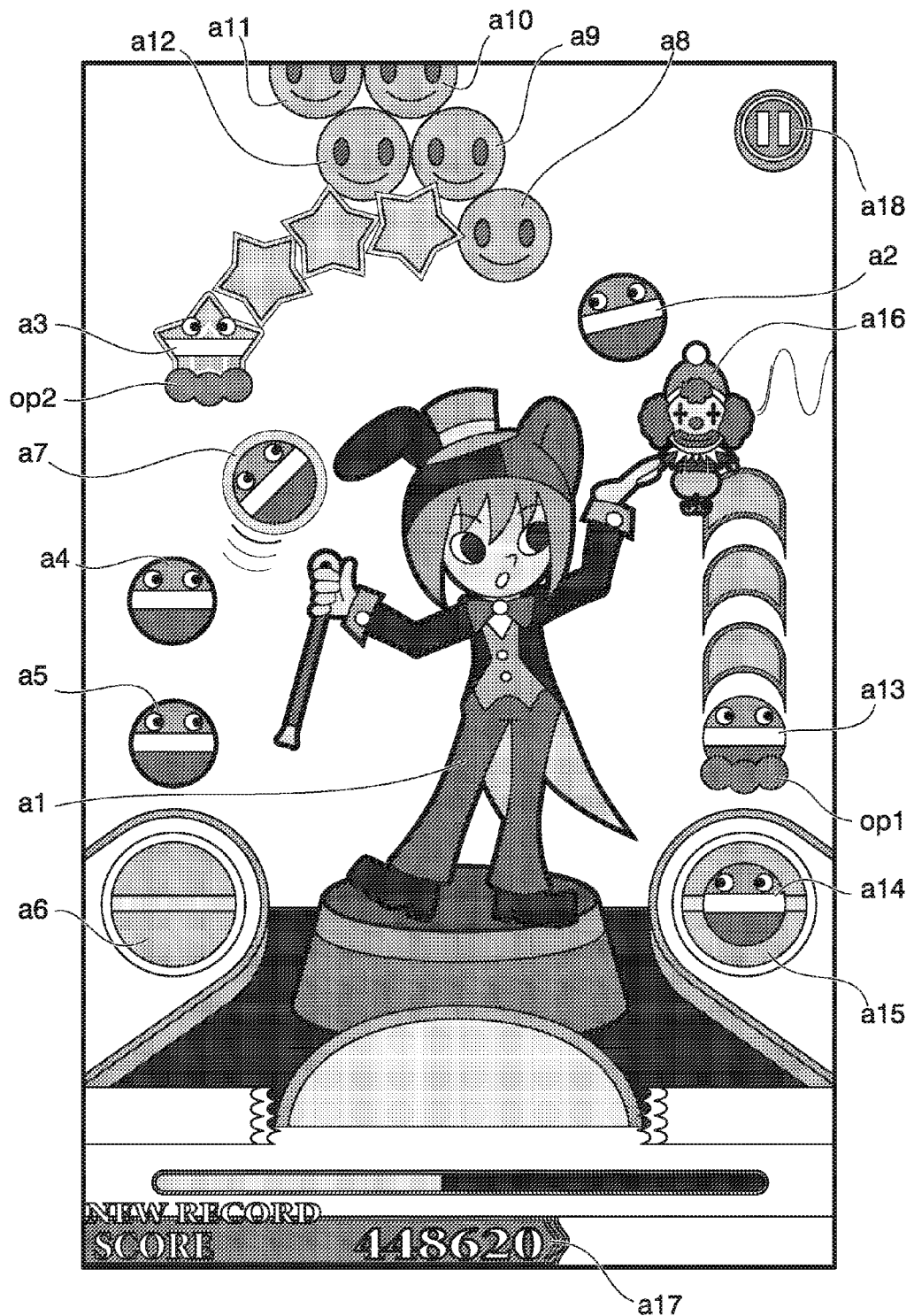
FIG. 2 shows an example of an image displayed on the screen of the touch panel 110.

A game provided by the game system 100 in the present embodiment will now be described. FIG. 2 shows an example of an image displayed on the screen of the touch panel 110. In the present embodiment, the game provided by the game system 100 is a timing game, in which a success/failure determination is made based on operation input from the user, in accordance with the a pre-established timing matched to the position of an object operated on the screen and an output melody. In this timing game, an object that moves in concert with the progression of the melody is displayed on the screen and, if an operation is made at the time at which the object reaches a prescribed area of the screen, the user is granted a reward. That is, if the user inputs an operation at a pre-established first timing, the success/failure determination is success, and the user is granted a reward. The first timing is, for example, the time at which the object reaches a prescribed area of the screen. Although the reward will be described as being points, the reward may be some sort of item or the like in the game.

For example, when a user selects a melody for playing a game, the game system 100 displays an image such as shown in the drawing on the touch panel 110. In this example, a character a1 is displayed in the central vicinity of the screen, and objects are released from the hand of the character a1, these serving as operation timing indexes in concert with the rhythm and progress of the melody. Stated differently, an object notifies the user of the first timing and also accepts an operation from the user. For example, an object informs the user that the arrival at a prescribed position is the first timing.

Although the movement of objects and the like described below indicates the movement of the main objects shown in FIG. 2, this is obviously not a restriction.

For example, the objects a2, a3, a4, and a5 are released from the left hand of the character a1, and each of the released objects, following a prescribed parabolic path, moves toward the determination circle a6, which is a prescribed area, and is caused to pass by the determination circle a6 at a constant speed, and when the object reaches the edge of the screen, the display thereof disappears. Although in a conventional timing game, objects such as these generally appear at the edge of the screen, in the present embodiment a character is displayed on the screen and the character releases the objects. This not only enables the presentation of an enjoyable display, with a colorful character, but also evokes in the user a feeling of oneness with the character and can be expected to have the user feel a close relationship to the game itself. Alternatively, for example, the character's expression or appearance can express the game situation or difficulty, thereby enabling a diverse spectrum of expressions and providing a new level of enjoyment, making the game even more enjoyable. The path of movement of the objects can either be displayed or not displayed on the screen.

When the objects a2 to a5 pass the determination circle a6, and an actuator touches the determination circle a6 at the prescribed first timing, the game system 100 makes a first success/failure determination based on the first timing and on the second timing at which the actuator touched the determination circle a6 and, based on the result of the first determination, determines a first reward to be granted to the user. The prescribed first timing is, for example, the time at which the center of a moving object coincides with the center of the determination circle a6. Coincidence includes the center of the object and the center of the determination circle a6 being offset within an allowable range.

The second timing is not restricted to being the timing at which the actuator touches the determination circle a6. For example, in the game system 100, the touch hot zone can be made the determination circle a6 and a prescribed area that includes the periphery thereof. In this case, the game system 100 judges the timing of the actuator touching the touch hot zone to be the second timing. The game system 100 may take the objects a2 to a5 or the objects a2 to a5 and a prescribed area that includes the periphery thereof as the touch hot zone. In this case, when any one of the objects a2 to a5 overlaps the determination circle a6, the game system 100 may judge that the timing at which the actuator touches the touch hot zone of the object a2 to a5 as the second timing. In this case, the first reward granted to the user may be determined in accordance with the amount of surface area overlap between one of the objects a2 to a5 and the determination circle a6, or may be determined in accordance with the position offset between the center of one of the objects a2 to a5 and the center of the determination circle a6.

The actuator is, for example, a user finger. The actuator is not limited to being a finger, and may be a dedicated pen or the like.

If the first timing and the second timing coincide, or are within a prescribed difference therebetween, the game system 100 judges success, and if the difference therebetween exceeds the prescribed difference, the game system 100 judges failure. If the result of the first success/failure determination is success, a reward (first reward) is granted to the user. If the result of the first success/failure determination is failure, a reward is not granted to the user.

In this case, the object a3 is a burst object. The object a3 on the screen has an image area op1 indicating the type of object. The image area op1 may display, for example, the characters "Burst" that indicates a burst object, or a mark that indicates a burst object.

In this case, a burst object is a succession of a plurality of star object images, these providing a guide for the timing of the actuator to touch the determination circle a6 in concert with the succession of object images passing the determination circle a6. For the burst object a3, success/failure is judged based on the number of times the actuator touches the determination circle a6 during the first timing set in accordance with the succession of object images, from first to last, passing the determination circle a6.

That is, the first timing in a burst object is, for example, the period of time from the time at which, of the succession of the plurality of object images included in the object a3, the first object image reaches the determination circle a6 to the time at which the last object image passes the determination circle a6. The first timing in a burst object may be a plurality of points of time at which the succession of the plurality of object images included in the burst object a3 passes the determination circle a6.

In the game system 100, when a user operation of touching the object a3 or the determination circle a6 and releasing the touch are detected, the determination is that a tap operation has been made. In the first timing period of a burst object, if a plurality of tap operations are made continuously, the game system 100 judges success in the first success/failure determination. In the first timing period of a burst object, the first success/failure determination is made each time a tap operation is made.

Additionally, in the present embodiment, the reward in accordance with this timing adds a new point-adding element in accordance with the type of operation at the second timing. Stated differently, in the present embodiment, in addition to the first reward by the first success/failure determination, a second reward is granted by the second success/failure determination. The second success/failure determination is executed in accordance with the type of operation made in the first success/failure determination. In the present embodiment, the second success/failure determination is executed when the operation used in the first success/failure determination is a flick. If the second success/failure determination is success, the second reward is granted.

For example, if the user operation made in the second timing is simply a tapping of the touch panel 110, only the first success/failure determination is made, and if the user operation made in the second timing is a flick, the objects a2 to a5 that have reached the determination circle a6 are not caused to pass thereby, but rather are thrown in the direction of the flick. The object a7 is an example of an object that was thrown in the upper-right direction from the determination circle a6. In the following, objects that will be flicked or have already been flicked in the embodiment will be noted as object a7. In the description in the present specification, "throwing an object in the flick direction" means moving an object in the direction established by the flick made by the user, and "object thrown in the flick direction" means an attempt to move an object or an object being in movement in the direction established by the user flick. And "an object was thrown in the flick direction" means that the object has been moved in the flick direction in response to a flick made by a user.

Five targets, a8, a9, a10, a11, and a12, are displayed at the top part of the screen, and if a thrown object a7 collides with at least one of the targets a8 to a12, the user is granted a reward that is determined in accordance with the target a8 to a12 that was collided with. If the object flicked by the user is a burst object or a long-press object, which will be described later, the last object of the succession of objects included in each object can be flicked to perform the same type of control.

That is, in the present embodiment, in addition to performing the first success/failure determination, which is a timing determination in a timing game, and granting a reward to a user, depending on the type of the operation made for the first success/failure determination in the timing game, a second success/failure determination of whether or not an object collided with a target is performed, and a further reward is granted if the determination result of the second success/failure determination is success. This enables the addition of a new game element to the timing game, enabling enhancement of the enjoyment of the game.

Although in this case the five targets a8, a9, a10, a11, and a12, are displayed in the example, the number of targets is arbitrary. If a thrown object a7 collides with a target a8 to a12, the target a7 may be extinguished. For example, if the targets a8 to a12 are circular balloons and the object a7 collides with targets, the display can be made to show the targets a8 to a12 breaking up and being extinguished, and if the targets a8 to a12 are square blocks and the object a7 collides with the targets a8 to a12, the display can be made to show the targets a8 to a12 being broken and extinguished. Alternatively, the targets a8 to a12 may not be extinguished if only one object a7 collides with them, and they may be extinguished and a reward granted at the time when a prescribed number of objects a7 collide with them. Although in this example the targets a8 to a12 are shown as being arranged on three rows from top to bottom, they may be arranged in an arbitrary number of rows and, for example, the number of the targets a8 to a12 may be increased as the game proceeds. In this case, for example, control can be performed so that, if the number of the targets a8 to a12 increases greater than the prescribed number of rows, the user is placed at a disadvantage (for example, the game is ended). A plurality of types of the targets a8 to a12, having different colors or appearances can be provided, and the reward can be varied, depending upon the type of targets a8 to a12.

The object a7 thrown by a flick may disappear at the point at which it collides with at least one of the targets a8 to a12, or may be allowed to passes through and burst at least one of the targets a8 to a12 and continue to move and collide with another target. Also, the object a7 thrown by a flick may be made to disappear from the screen when it reaches the left or right edge of the screen, or may be made to be reflected from left and right edges of the screen and disappear only from the top and bottom edges.

In the example in the drawing, the objects a13 and a14 are released from the right hand of the character a1 in the same manner, and the released objects a13 and a14 and are caused to move along a prescribed parabolic path toward the determination circle a15, which is a prescribed area. In this case, the object a13 is a long-press object. The released object a13 on the screen has an image area op2 indicating the type of the object. The image area op2 may display characters such as "long press" indicating that object is a long-press object, or a mark that indicates a long-press object.

A long-press object in this case is one that the body image of the object appears to leave an after-image tail, and if the touch operation is made continuously between the time from the point at which the body image of the object a13 reaches the determination circle a15 until all of the object images corresponding to the tail of the object a13 pass the determination circle a15, the determination of success is made at the first success/failure determination. That is, the first timing of a long-press object is, for example, from the time at which the body image of the object a13 reaches the determination circle a15 until the time when all the object images corresponding to the tail of the object a13 have passed the determination circle a15. In the game system 100, if the time from the point at which a user operation (touch) is input at the object a13 or the determination circle a15 until the point at which the user touch is released exceeds a pre-established time length, an acceptor 133 accepts this as a long-press operation. If a long-press operation is input at the first timing of a long-press object, the first success/failure determination judges this to be success.

In this case, in addition to the targets a8, a9, a10, a11, a12, which are displayed statically at the top of the screen, there is a target a16, which randomly moves on the screen. The target a16, for example, appears at the left edge of the screen and moves toward the right edge, at which it disappears. If, during a certain amount of time in which the target a16 is displayed on the screen, the object a7 is thrown by a flick and collides with the target a16, a reward in accordance with the target a16 is granted to the user. If the moving target a16 is about to collide with the thrown object a7, it may be moved to avoid a collision. By placing the target a16 that is controlled in this manner, it is possible to heighten the interest in the game. In this case, once the target a16 is moved to avoid collision, it may be controlled so that it cannot be move to avoid collision for a prescribed period of time. Therefore, if the user throws the object a7 toward the moving target a16, even if it makes an evading movement, if the object a7 is thrown at the target a16 that moves again during the period in which evasive movement is not possible, it is possible to make the object a7 collide with the moving target a16, thereby heightening the interest in the game.

The score a17 is the total value of the rewards (points) granted to the user.

The button a18 is for temporarily stopping the progression of the game and, when pressed, the progression of the game is paused, and the indicator showing the button a18 is changed, for example, to a rightwardly pointing triangle. If the button a18 displayed as rightward-pointing triangle mark is pressed, the progression of the game resumes.

The constitution of the game system 100 providing a game such as this is described in detail below.

The storage 120 is constituted by recording medium such as a RAM (random access memory), a ROM (read-only memory), a hard-disk drive (HDD), or a combination thereof, and stores various programs and various information for the purpose of controlling the various parts of the game system 100. The storage 120 has a melody data storage 121 and a sequence data storage 122.

The melody data storage 121 stores melody data that is the game target.

Figure 3:
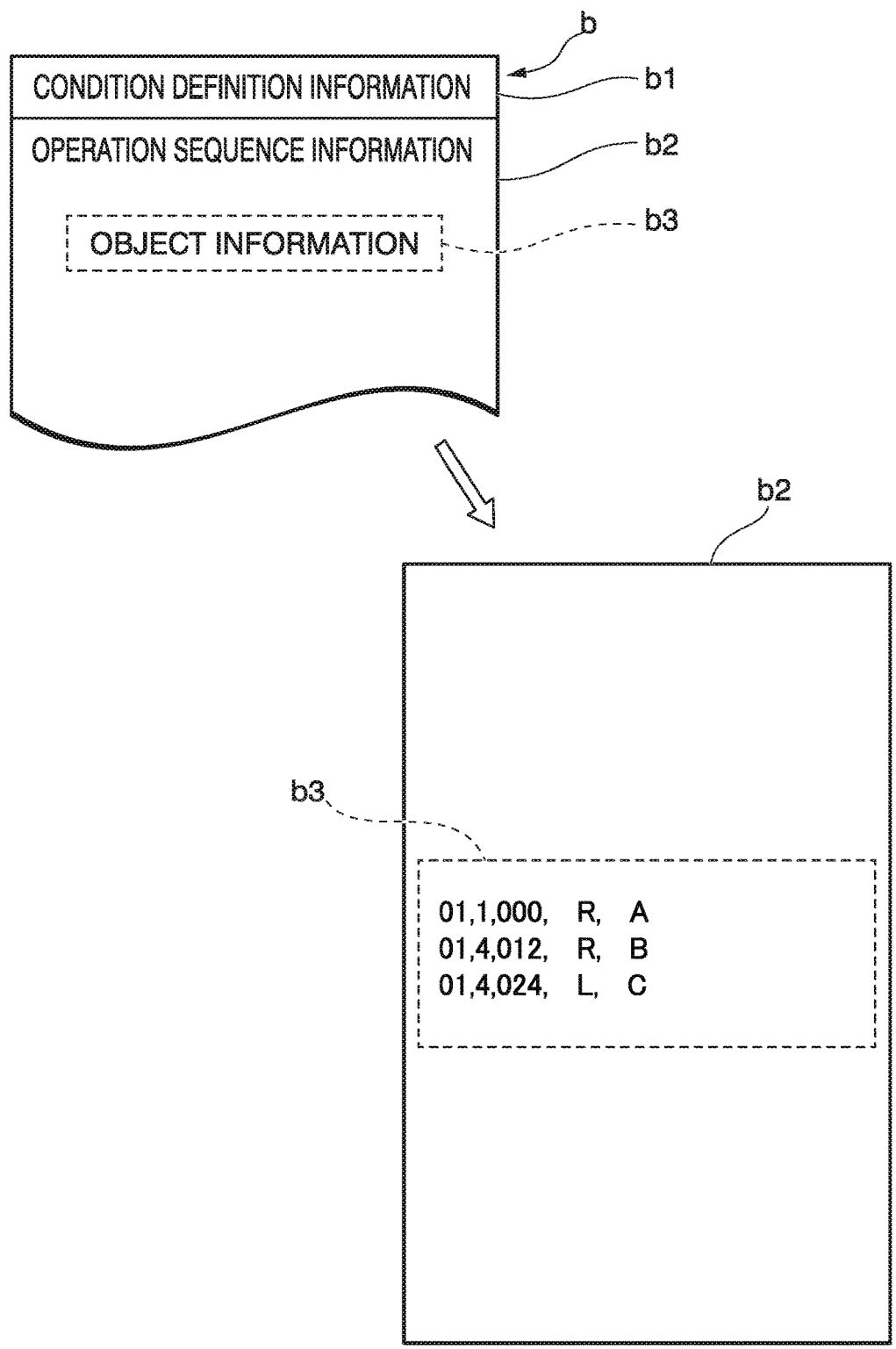
FIG. 3 is an example of the content of the sequence data b.

The sequence data storage 122 stores sequence data that describes the first timing at which a user operation is to be input to match the progression of the melody. The sequence data will now be described in detail, with reference made to FIG. 3. FIG. 3 is an example of the content of the sequence data b. As shown in FIG. 3, the sequence data b includes the condition definition information b1 and the operation sequence information b2. Various conditions for executing a game, such as the melody ID for identifying the melody, the music tempo, the beat, the track, and the melody length are coded into the condition definition information b1.

The touch operation instructions, in association with the first timings within a melody indicated, are coded in the operation sequence information b2. The operation sequence information b2 includes the object information b3 used for displaying the objects (for example, a2 to a5, a13, a14) along a parabolic path on the screen.

The object information b3 includes timing information (reference times) of first timings within a melody, path information giving an instruction for one of two paths for displaying an object, and type information giving an instruction for the type of an object. The object information b3 is constituted by a plurality of record sets that are mutually associated. In the example shown in the drawing, the various information are, from the left, the time information within a melody, the path information, and the type information.

The timing information within a melody is coded as the value of the bar number within the melody, the beat number, and the time within a beat, separated by commas. The timing within a beat is the elapsed time from the start of a beat, expressed as the number of units of time, when the length of a beat is divided evenly into n units of time. For example, if n=100, the time when ¼ of the second beat of the first bar of a melody has elapsed from the head of that beat would be coded as "01, 2, 025".

The path information is coded using information indicating the selection of one of two paths. With the path from the right hand of the character a1 as the starting point passing through the determination circle a15 as R, and the path from the left hand of the character a1 as the starting point passing through the determination circle a6 as L, the path information is coded as either R or L. The type information indicates the type of displayed object. For example, with a normal object requiring a single tap as A, a burst object as B, and a long-press object as C, the type information is coded as any one of A, B, and C. Although the description of the present embodiment is for the example of these three object types, other types of objects may exist.

In other words, a normal object A, based on a single tap or a long-press, is an object for which the first success/failure determination is executed. A burst object B, based on a plurality of taps or long-press input in the first timing period of the burst object, is an object for which the first success/failure determination is executed. A long-press object C, based on at least one long press input in the first timing period of the long-press object, is an object for which the first success/failure determination is executed.

In this case, for example, instructions are coded so that a normal object (A) is moved over the path (R) from the right hand of the character a1 as the starting point passing through the determination circle a15 so that it reaches the determination circle a15 at the starting time (000) of the first beat (1) of the first bar (01). Also, instructions are coded so that a burst object (B) is moved over the path (R) from the right hand of the character a1 as the starting point passing through the determination circle a15 so that it reaches the determination circle a15 when just 012 units have elapsed from the starting point at the fourth beat (4) of the first bar (01). Also, instructions are coded so that a long-press object (C) is moved over the path (L) from the left hand of the character a1 as the starting point passing through the determination circle a6 so that it reaches the determination circle a6 at just 024 units after the starting time of the fourth beat (4) of the first bar (01).

The controller 130 has an information processing device such as a CPU (central processing unit) that functions as the control center of the game system 100 and controls the various parts thereof. The game system 100 has a game controller 131. The game controller 131 is constituted, for example, so as to read out a game program installed and stored in the storage 120, the program being executed by the controller 130. The game controller 131 has an output controller 132, an acceptor 133, a determiner 134, and a reward controller 137.

The output controller 132 controls the output of the sound output 103 and the image output of the touch panel 110. For example, the output controller 132 reads out and outputs to the sound output 103 the melody data stored in the melody data storage 121 so as to reproduce the sound. The display controller 132 causes display of an image as described above on the touch panel 110 screen.

For example, the output controller 132 displays the objects a2 to a5, a13, a14, and the like on the screen, at a timing based on the sequence data b, and moves them toward the determination circles a6 and a15, which are prescribed areas. Stated differently, the output controller 132 moves an object of a type coded in the sequence data b along the path (R) or the path (L) coded in the sequence data b and causes the object to reach the determination circles a6 and a15 at a first timing coded in the sequence data b.

The output controller 132 displays the targets a8 to a12 and the like within the screen. In the present embodiment, the output controller 132 displays on the screen the character a1 that releases the objects a2 to a5, a13, a14, and the like and moves the objects a2 to a5, a13, a14, and the like released from the character a1 toward a prescribed area.

For example, if the user selects a melody for playing the game, the output controller 132 reads out data of the selected melody from the melody data storage 121 and outputs it to the sound output 103 to reproduce the melody. The output controller 132 reads out the sequence data b stored in the sequence data storage 122. The output controller 132 judges the first timing included within the prescribed time range from the current time moving forward in time, based on the sequence data b, displays on the screen an object in accordance with each of the judged first timings, displays the current time indicator (determination circle) indicating a prescribed area corresponding to the current time along with an object at positions in a time sequence along the prescribed path on the screen, and also provides a guide to the first timing by causing a relative change along a prescribed path between the object and the determination circle, so that, accompanying a reduction in the time difference between each of the first timings and the current time, the distance between the object and the determination circle is reduced.

Stated differently, the output controller 132 judges whether or not the first timing coded in the sequence data b has been approached. For example, if the first timing is included within the range between the current reproduction time of the melody and a prescribed amount of time thereafter, the output controller 132 judges that the first timing has been approached. If the determination is that the first timing has been approached, an object in accordance with the type of object associated with the first timing in the sequence data b is displayed on the screen.

For example, the output controller 132 calculates the time of movement along the path (R) or the path (L) coded in the sequence data b of an object up until it reaches the determination circle a6 or a15. The output controller 132, based on the calculated movement time, back calculates the time of release in order for the object to reach the determination circle a6 or a15 at the first timing. If the determined release time has been reached, the output controller 132 causes the release of the object from the character a1 toward the determination circle (for example, a6 or a15), which is the position of arrival. The output controller 132 then moves the object at a constant speed along the path coded in the sequence data b. The output controller 132 displays the movement of the object released from the character a1 along the path (R) or (L), in accordance with the elapsed time of the melody. This reduces the distance between the object moving along the path (R) or (L) and the determination circle a6 or a15 as time elapses.

The timing of the objects a2 to a5, a13, and a14 reaching the determination circle a6 or a15 is the first timing. Thus, by the object moving toward the determination circle a6 or a15, the user can be notified of the approach to the first timing. By the objects a2 to a5, a13, and a14 reaching the determination circle a6 or a15, the user can be notified that the first timing has been reached.

In this manner, based on the information coded in the sequence data b, the output controller 132 moves the object along a path established from the release position up to the arrival position. The movement speed of the object may be arbitrarily changed. Also, the release time of the object can be arbitrarily changed, as long as the object reaches the arrival position at the first timing. The object release position and arrival position may be included in the path. In this manner, the output controller 132 references at least the first timing path and the type of object so as to move the object to the arrival position. This is not a restriction, and the output controller 132 may arbitrarily combine a plurality of parameters, such as the object release position, release time, arrival position, arrival time (first timing), path, and the object movement speed and move the object up to the arrival position so that the object arrives at the first timing. The output controller 132 may reference a part of the parameters coded in the sequence data b and derive the other parameters. All of the parameters may be coded into the sequence data b.

The output controller 132 may select one of a plurality of paths and move the object along the selected path up to the arrival position. In this case, the path may be selected by the user, or may be selected by the output controller 132 in accordance with the game performance at the time the object is released. The path may be selected by the output controller 132 in accordance with the type of object.

If the determination result of the first success/failure determination indicates failure, the output controller 132 moves the objects a2 to a5, a3, and a14 and the like as is to pass through the determination circle a6 or a15 cause them to disappear at the lower edge of the screen. In contrast, if the determination result of the first success/failure determination indicates success, the output controller 132 controls the operation of the objects a2 to a5, a13, and a14 and the like based on the type of operation input accepted by the acceptor 133. For example, if the determination is that the type of operation input accepted by the acceptor 133 is prescribed type, the output controller 132 controls so as to make the second success/failure determination.

Specifically, if the prescribed type is, for example, a flick, and the output controller 132 judges that the type of the operation is the prescribed operation (a flick), it controls so that the flicked object is thrown so as to move in the flick direction. In the example shown in FIG. 2, the object a7 is flicked at the timing at which the object a7 reaches the determination circle a6, and the object a7 is thrown in the flick direction. In the present embodiment, although the description is for the case in which an object for matching the timing is the same as an object thrown in the flick direction, the object for matching the timing and the object thrown in the flick direction may be different. If the determination is made that the type of operation is not the prescribed type (for example, a tap), the output controller 132 causes the tapped object to disappear.

The acceptor 133 accepts an input of an operation made with respect to the input 102. The acceptor 133 can accept input of a plurality of types of operations. For example, the acceptor 133 can, in response to an input signal generated by the touch panel 110, accept input of operations of types such as one-time tap of the touch panel 110, or a flick made by sliding in an arbitrary direction while remaining in contact.

To describe this more specifically, the acceptor 133 judges that a tap operation was made if the time from the contacting of the touch panel 110 by an actuator such as a user's finger until the actuator releases the touch is less than a pre-established time length.

The acceptor 133 judges that an input operation was a flick operation if it detects that the touch position moves quickly (within a prescribed time) by at least a prescribed distance, with the actuator such as a user's finger remaining in contact with the touch panel 110.

The acceptor 133 judges that an operation was a long-press if the time from the actuator such as a user's finger making contact with the touch panel 110 until the actuator releases the touch exceeds a pre-established time length.

The acceptor 133 judges continuously input tap operations to be a burst operation. If the number of tap operations input continuously exceeds a pre-established threshold, or the interval between continuously input tap operations is shorter than a pre-established time, the acceptor 133 may judge that the tap operations have been made continuously.

The determiner 134 has a first determiner 135 and a second determiner 136, and, in response to an input accepted by the acceptor 133, makes success/failure determinations in the game.

The first determiner 135 makes a first success/failure determination based on the first timing of an object moving on the screen reaching the determination circle and the second timing of the acceptor 133 accepting an input. In this case, the first determiner 135 can also make a determination of different evaluations at a plurality of steps, in accordance with the difference between the first timing and the second timing. For example, the determination can be made so that if the difference between the first timing and the second timing is 0.0 second or greater and within 0.2 second, the determination result is "COOL", if the difference is 0.21 second or greater and within 0.4 second, the determination result is "GREAT", if the difference is 0.41 second or greater and within 0.8 second, the determination result is "GOOD", and if the difference is 0.81 or greater, the determination result is "BAD".

The first determiner 135 may make the first success/failure determination in accordance with whether or not the relationship between the first timing and the second timing completely coincide, coincide closely, and in proximity, or are separated. As one example, completely coinciding corresponds to a determination result of "COOL", closely coinciding corresponds to a determination result of "GREAT", in proximity corresponds to the determination result of "GOOD", and separated corresponds to the determination result of "BAD". The first determiner 135, for example, judges that the first success/failure determination succeeded in the case of complete coinciding, closely coinciding, and in proximity, and judges that the first success/failure determination failed in the case of separated.

The first determiner 135 may determine the relationship between the first timing and the second timing as a difference on the time axis, or may determine it by a distance or surface area on the screen. For example, the first determiner 135 may determine the complete coincidence, close coincidence, proximity, and separated in sequence starting from the smaller time difference between the first timing and the second timing. The first determiner 135 may determine one of the complete coincidence, close coincidence, proximity, and separated by comparison between a pre-established threshold and the time difference. The first determiner 135 may determine the complete coincidence, close coincidence, proximity, and separated in sequence from the smaller distance difference between the object displayed on the screen and the determination circle at the second timing. The distance difference is, for example, the length from the center of the object displayed on the screen and the center of the determination circle at the second timing. By comparing the distance difference with a pre-established threshold, the first determiner 135 determines one of the complete coincidence, close coincidence, proximity, and separated. Additionally, the first determiner 135 may determine complete coincidence, close coincidence, proximity, and separated in sequence from the larger surface area of overlap between the object displayed on the screen and the determination circle. By comparing the overlapping surface area with a pre-established threshold, the first determiner 135 determines one of complete coincidence, close coincidence, proximity, and separated. The success/failure determination made by the first determiner 135 is not restricted to being the four above-noted steps (complete coincidence, close coincidence, proximity, and separated), and can be a greater or fewer number of steps.

If the first success/failure determination result is success, the second determiner 136 makes the second success/failure determination, based on the type of operation input accepted by the acceptor 133. For example, if the determination result of the first success/failure determination indicates success, the second determiner 136 judges whether or not the operation made with respect to the acceptor 133 is a prescribed type (for example, a flick). If the second determiner 136 judges that the type of the operation made with respect to the acceptor 133 was not a flick, it judges that the second success/failure determination failed. If the type of operation made with respect to the acceptor 133 is not a flick, the second determiner 136 may not perform the second success/failure determination. If the second determiner 136 judges that the operation made with respect to the acceptor 133 is a flick, it performs a second determination that judges a success if the object a7 that moves in a direction in response to that flick collides with at least one of the targets a8 to a12, and that judges a failure if there is no collision.

The reward controller 137, based on the result of the determination by the determiner 134, determines the reward to be granted to the user. In this case, if the determination result of the first success/failure determination by the first determiner 135 indicates success, the reward controller 137, based on the determination result of the second success/failure determination performed based on the type of operation input accepted by the acceptor 133, determines the reward to be granted. The reward controller 137 has a first reward controller 138 and a second reward controller 139.

The first reward controller 138 determines the first reward to be granted to the user based on the determination result by the first determiner 135. For example, the first reward controller 138 can grant a reward in accordance with the evaluation, in the sequence of "COOL", "GREAT", "GOOD", and BAD in order of decreasing determination result evaluation, and can grant the maximum reward if the determination result is "COOL" and not grant a reward if the determination result is "BAD".

The first reward controller 138 may determine the first reward in accordance with whether the relationship between the first timing and the second timing is complete coincidence, close coincidence, proximity, or separated. For example, the first reward controller 138 may grant a larger reward, the smaller is the time difference between the first timing and the second timing, and grant a smaller reward, the larger is the time difference. Also, the first reward controller 138 may grant a larger reward, the smaller is the distance difference between the object displayed on the screen at the second timing and the determination circle, and a smaller reward, the larger is the distance difference therebetween. The first reward controller 138 may grant a larger reward, the larger is the overlap surface area between the object displayed on the screen at the second timing and the determination circle, and grant a smaller reward, the smaller is the smaller is the distance difference.

The second reward controller 139 determines the second reward to be granted to the user based on the determination result by the second determiner 136. For example, if the determination result by the first determiner 135 indicates success, the second reward controller 139 determines the second reward to be granted to the user, based on the second determination result by the second determiner 136. As described above, for example, if the second determiner 136 judges that the type of operation at the second timing is not the prescribed type, the determination of failure is made at the second success/failure determination. Alternatively, if the type of operation made response to the first timing is the prescribed type, the second success/failure determination is performed based on whether or not the object a7 that was moved in a direction responsive to the operation input accepted by the acceptor 133 collided with at least one of the targets a8 to a12, success being judged if the object a7 collided with at least one of the targets a8 to a12, and failure being judged if there was no collision. The second reward controller 139 determines the second reward to be granted to the user in accordance with the determination result of the second success/failure determination made in this manner. For example, the reward can be granted to the user so that, if there is a collision with at least one of the targets a8 to a12, a reward determined in accordance with at least one of the targets a8 to a12, and if there is no collision with at least one of the targets a8 to a12, no reward is granted to the user.

The reward controller 137 grants to the user a reward determined by the first reward controller 138 and the second reward controller 139.

Figure 4:
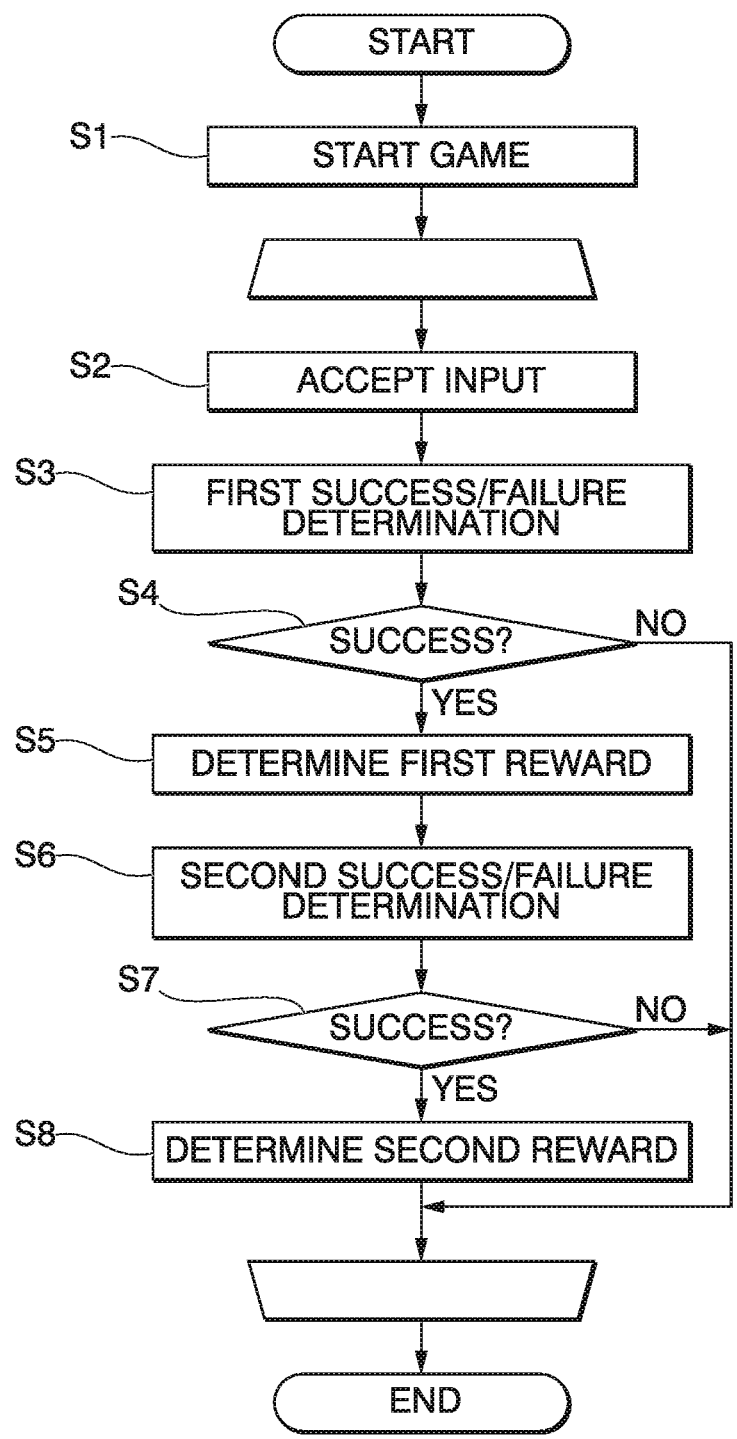
FIG. 4 is a flowchart showing an example of the operation of the game system 100 according to a first embodiment.

Next, an example of the operation of the game system 100 according to the present embodiment will be described. FIG. 4 is a flowchart showing an example of the operation of the game system 100 according to the present embodiment.

When the start of a game provided by the game controller 131 is selected by the user and the melody to be played is selected, the output controller 132 reads out the selected melody data from the melody data storage 121, causes the sound output 103 to output and to reproduce the melody, reads out the sequence data b corresponding to the melody from the sequence data storage 122, displays images such as described above on the display 101, and starts the game (step S1).

The game system 100 performs the processing of the following steps S2 to S8, for each first timing established by the sequence data b. The acceptor 133 accepts input to the input 102 of operations in accordance with the progression of the melody (step S2). The first determiner 135 performs the first success/failure determination based on the first timing established in the sequence data b and on the second timing at which an operation is input to the input 102 (step S3). If the first determiner 135 judges failure in the first success/failure determination (NO at step S4), the processing is ended at that first timing.

If the first determiner 135 judges success in the first success/failure determination (YES at step S4), the first reward controller 138 determines the reward to grant to the user based on the determination result by the first determiner 135 and grants the reward to the user (step S5). If the type of operation input at step S2 is judged to be a flock, the output controller 132 moves the object in the direction of the flick. The second determiner 136 performs the second success/failure determination (step S6). In this case, if the operation type is not flick or is a flick and the moved object a7 does not collide with a target (for example, at least one of a8 to a12, a16, and the like), the second determiner 136 judges failure (NO at step S7) and ends the processing at that first timing. If the moved object a7 collides with a target (for example at least one of a8 to a12, a16, and the like), the second determiner 136 judges success (YES at step S7) and the second reward controller 139 determines the reward in accordance with the target that was collided with (for example, a8 to a12, a16, and the like), and grants the reward to the user (step S8)

As described above, according to the present embodiment, in addition to the game enjoyment of operating in timing with a melody in a timing game, it is possible to incorporate a new enjoyment by making a special operation such as a flick when the operation is made so as to make the object a7 directly hit a target (for example, a8 to a12, a16, and the like), thereby expanding the range of enjoyment provided.

If the prescribed operation at the second timing in accordance with the first timing is a flick and performing a second success/failure determination by throwing the object a7 in the flick direction, it is possible to control the flying operation of the object a7 in accordance with the flick operation. For example, if a target (for example, a8 to a12, a16, or the like) is displayed at the top part of the screen, even if a downwardly directed flick is done to move the object a7 downward, the object a7 cannot collide with the target.

Given the above, if the object a7 is thrown to the left, right, or lower edge of the screen, reflection processing may be performed to control so that it is reflected at the left, right, or lower edge and continues flying. Doing this enables control so that the reflected object a7 is directed toward the target (for example a8 to a12, a16, or the like) at the top part. In this case, the object a7 may be specularly reflected at the opposite angle as the angle of striking formed between the flying direction and the edge, or may be randomly reflected in accordance with some condition. For example, control can be performed so that, the flying speed of the object is changed in accordance with an evaluation determined based on the sliding speed in the flick operation or the difference between the first timing and the second timing, and so that, for example, in accordance with the flying speed as a condition, the random reflection angle is made small if the flying speed is fast and large if the flying speed is slow. This type of reflection processing may be such that, for example, reflections occur a plurality of times, with an object that was thrown leftward being reflected at the left edge surface, heading toward the right, and being further reflected at the right edge thereafter when the angle of flick operation toward the left direction is near the angle orthogonal to the left edge surface.

Figure 5:
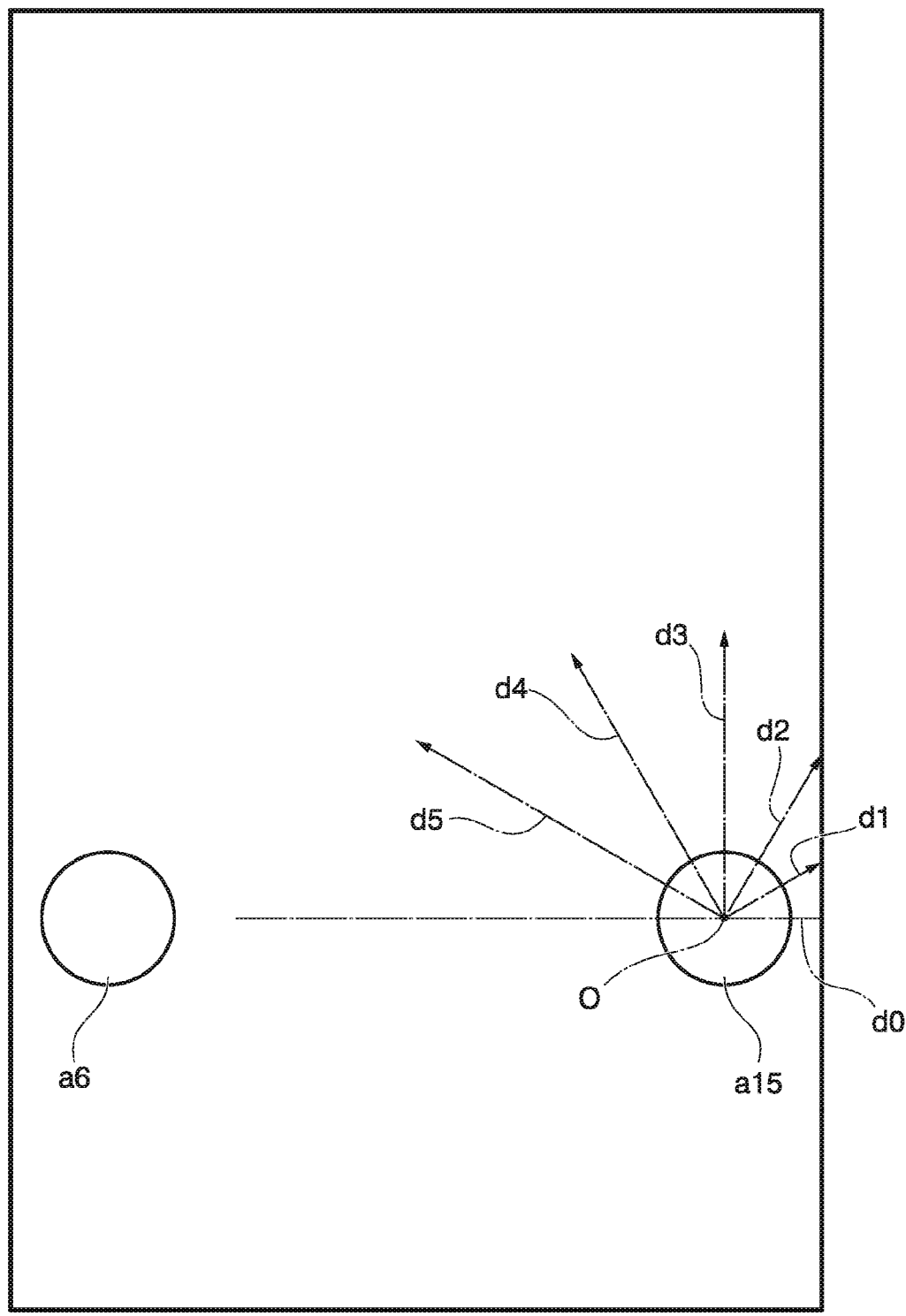
FIG. 5 shows examples of flick directions, and provides a simplified example of an image displayed on screen of the touch panel.

Alternatively, a valid flick direction can be established in the second success/failure determination. FIG. 5 shows examples of flick directions, this drawing showing a simplified example of an image displayed on screen of the touch panel 110, with reference symbols a6 and a15 corresponding to the above-described determination circle a6 and determination circle a15. In this case, if a flick operation is made in the downward direction, the flick operation is invalid and invalid processing is performed that performs control the same as if a tap was made. That is, taking the example of the determination circle a15, if a flick operation is made at the first timing, at which the object a14 arrives, if the flick direction is downward from the horizontal line d0, the output controller 132 does not perform control to throw the object a14 in the flick direction, and the second determiner 136, with the prescribed type of operation (flick operation) not having been made, judges a failure in the second success/failure determination. In this case, the range in which control is performed in accordance with a flick operation may be the 180-degree range above the horizontal line d0, or may be, for example, a 150-degree range in the first and second quadrants, for example, with the determination circle a15 as the center, with the exclusion of the approximately 15 degrees each from the horizontal line d0, with a flick in any other range resulting in control as an invalid flick.

Alternatively, prescribed directions may be established as the directions in which a flick operation throws the object a14, and correction processing to correct the direction in which the object a14 is thrown may be performed. For example, the 360 degrees of direction about the center of the determination circle a15 at which the flick operation is made is classified into 12 directions of 30 degrees each, and these 12 directions are established as the prescribed directions in which the object a14 is thrown. Then, control can be done so that the direction in which the object a14 is thrown is corrected to the closest of these 12 directions to the flick direction so as to throw the object a14 in that direction.

Alternatively, this type of correction processing can be combined with the invalid processing. For example, as shown by the reference symbols d1 to d5 in FIG. 5, the upper area centered on the center point O of the determination circle a15 above the horizontal line d0 can be divided into regions of 30 degrees each, and the five directions of 30, 60, 90, 120, and 150 degrees, which exclude the horizontal directions (0 and 180 degrees) with respect to the horizontal line d0, marked by the reference symbols d1 to d5, is established as a prescribed direction to throw the object a14. With flicks in a direction downward from the horizontal line d0 as invalid, control can be performed so that, for flicks above the horizontal line d0, the direction in which the object a14 is thrown is corrected to be the direction that is closest to the flick direction of the five directions shown by the reference numerals d1 to d5, and the object a14 is thrown in that direction.

Any one only of the object reflection processing, the flick invalid processing, and the flick direction correction processing can be performed, and control can be done that combines a plurality thereof. For example, if the reflection processing and the correction processing are combined, if the object a14 is specularly reflected, because the flying direction and reflection position and reflection angle of the object a14 are limited to a fixed pattern, control can be done so that the object a14 is thrown in a pre-established direction, without performing processing such as to compute the reflection angle each time of reflection.

Second Embodiment

Next, the second embodiment of the present invention will be described. In the first embodiment, the first reward is granted based on the determination result of the first success/failure determination, and the second reward is determined based on the determination result of the second success/failure determination and the second reward is granted in addition to the first reward. In contrast, the game system 100 of the present embodiment, after determining a success by the first success/failure determination and making the second success/failure determination, determines the reward to be granted to the user based on the results of both the first success/failure determination and the second success/failure determination.

For example, after provisionally determining the first reward to be granted to the user based on the first success/failure determination, if the determination result of the second success/failure determination is success, a second reward is granted that is the result of multiplying the first provisional reward based on the first success/failure determination by a prescribed multiplier. If the determination result of the second success/failure determination is failure, the first reward that was provisionally determined based on the first success/failure determination is granted as is.

Figure 6:
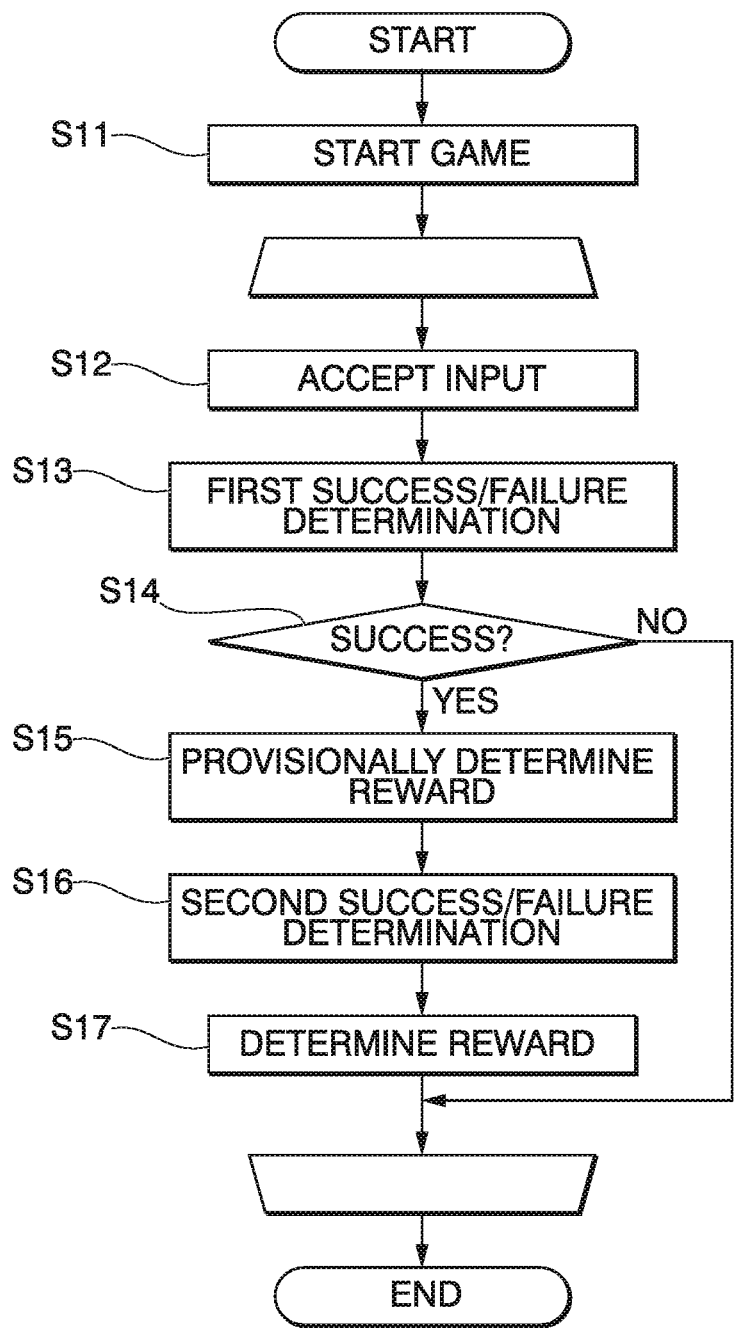
FIG. 6 is a flowchart showing an example of the operation of the game system according to the second embodiment.

FIG. 6 is a flowchart showing an example of the operation of the game system 100 according to the present embodiment.

Steps S11 to S14 are the same as steps S1 to S4 in the first embodiment, and the game system 100 performs processing from the following step S12 to step S17 for each first timing established by the sequence data. If the first determiner 135 judges a failure in the first success/failure determination (NO at step S14), it ends the processing. If the first determiner 135 judges success in the first success/failure determination (YES at step S14), the first reward controller 138 provisionally determines the first reward to be granted to the user, based on the determination result by the first determiner 135 (step S15). If the type of the operation input is judged at step S12 to be a flick, the output controller 132 moves the object toward the flick direction. The second determiner 136 performs the second success/failure determination (step S16). The second reward controller 139 determines the multiplier based on the determination result by the second determiner 136 and, based on the first reward provisionally determined by the first reward controller 138 and the determined multiplier, determines the second reward to be granted to the user and grants the determined second reward (step S17).

By doing this, because the reward to be granted is determined by the determination result of the first success/failure determination and the determination result of the second success/failure determination, it is possible to provide a game enjoyment different from that of the first embodiment. For example, if a reward that is granted is the first reward provisionally determined by the first determination result multiplied by a prescribed multiplier if the second determination result was success, the span from high to low of the first reward according to the first determination result can be increased by the second determination result. In this case, for example, even if the first success/failure determination is success, if the second determination result is failure, the first reward and the second reward can be made zero. In such cases, although the success by the first determination result is cancelled out, the reward when the second determination result is success can be made larger, thereby providing game enjoyment. For example, in a situation in which it is difficult to make a direct hit of a target with an object, it is possible to reliably obtain a reward by the usual tap, and in a situation in which there is a high possibility of making a direct hit of the target with an object, a strategy of making a flick to try to obtain a higher reward is effective, thereby enabling heightened game enjoyment.

In this manner, the present invention can be applied in either the case in which, as shown in the first embodiment, the relationship between the first reward based on the first determination result and the second reward based on the second determination result is that they are added, or the case in which, as shown in the second embodiment, the relationship between the first reward based on the first determination result and the second reward based on the second determination result is that they are multiplied.

Third Embodiment

Next, the third embodiment of the present invention will be described. Whereas the first and second embodiments show examples in which the character a1 is displayed on the screen and the displayed character a1 releases objects (for example, a2 to a5, a7, a13, a14, or the like), it is possible to perform reward control as described above even when objects (for example, a2 to a5, a7, a12, a14, or the like) appear from the edge of the screen, such as in a conventional timing game.

Figure 7:
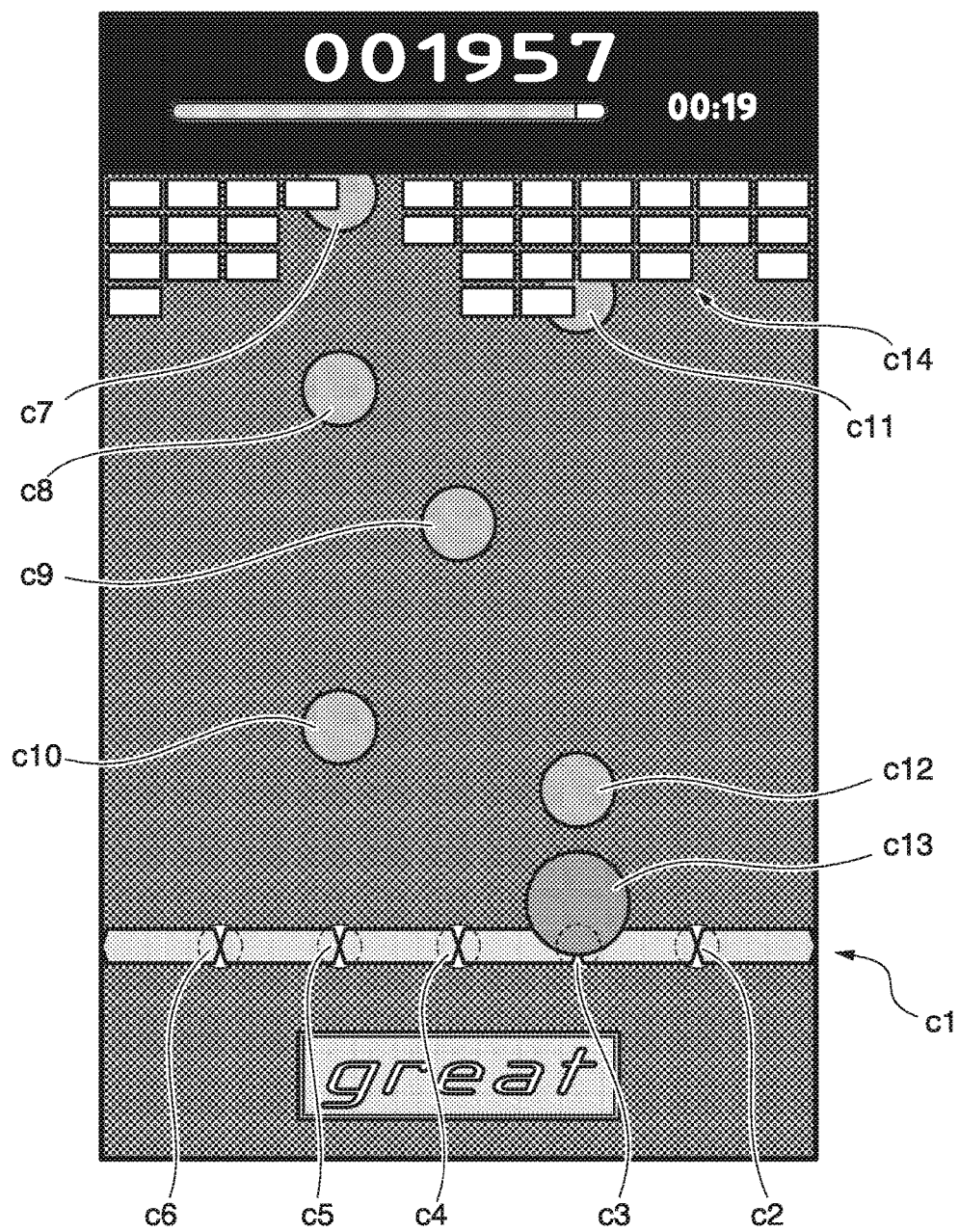
FIG. 7 shows an example of the image displayed on the screen of the touch panel 110 in the third embodiment.

FIG. 7 shows an example of the image displayed on the screen of the touch panel 110 in the present embodiment. In this case, the reference line c1 that indicates the first timing has determination areas established therein at the five locations of the track c2, the track c3, the track c4, the track c5, and the track c6. In this example, the object c7, the object c8, the object c9, the object c10, the object c11, the object c12 and the object c13 are moved toward the reference line c1 from above each of the tracks c2 to c6. In such cases, control is performed the same as in the first and second embodiments, based on operations performed to match the first timing, at which an object c7 to c13 reaches any of the tracks c2 to c6. For example, if a flick is made of an object c7 to c13 to match the first timing of the object from c7 to c13 reaching any of the tracks c2 to c6, the object c7 to c13 is moved so that it flies in the flick direction. Then, the second success/failure determination is performed and the reward granted to the user is determined, based on whether or not the object c7 to c13 collides with a plurality of square targets c14 displayed at the top of the screen.

Other Embodiments

The various functions of the game system 100 in the above-described embodiments, in accordance with whether the environment is a cloud environment or a network environment, the number of users, the type of game, and the number and specifications of hardware provided for constituting the game system, can be distributed among or integrated into an arbitrary number of computer devices.

Figure 8:
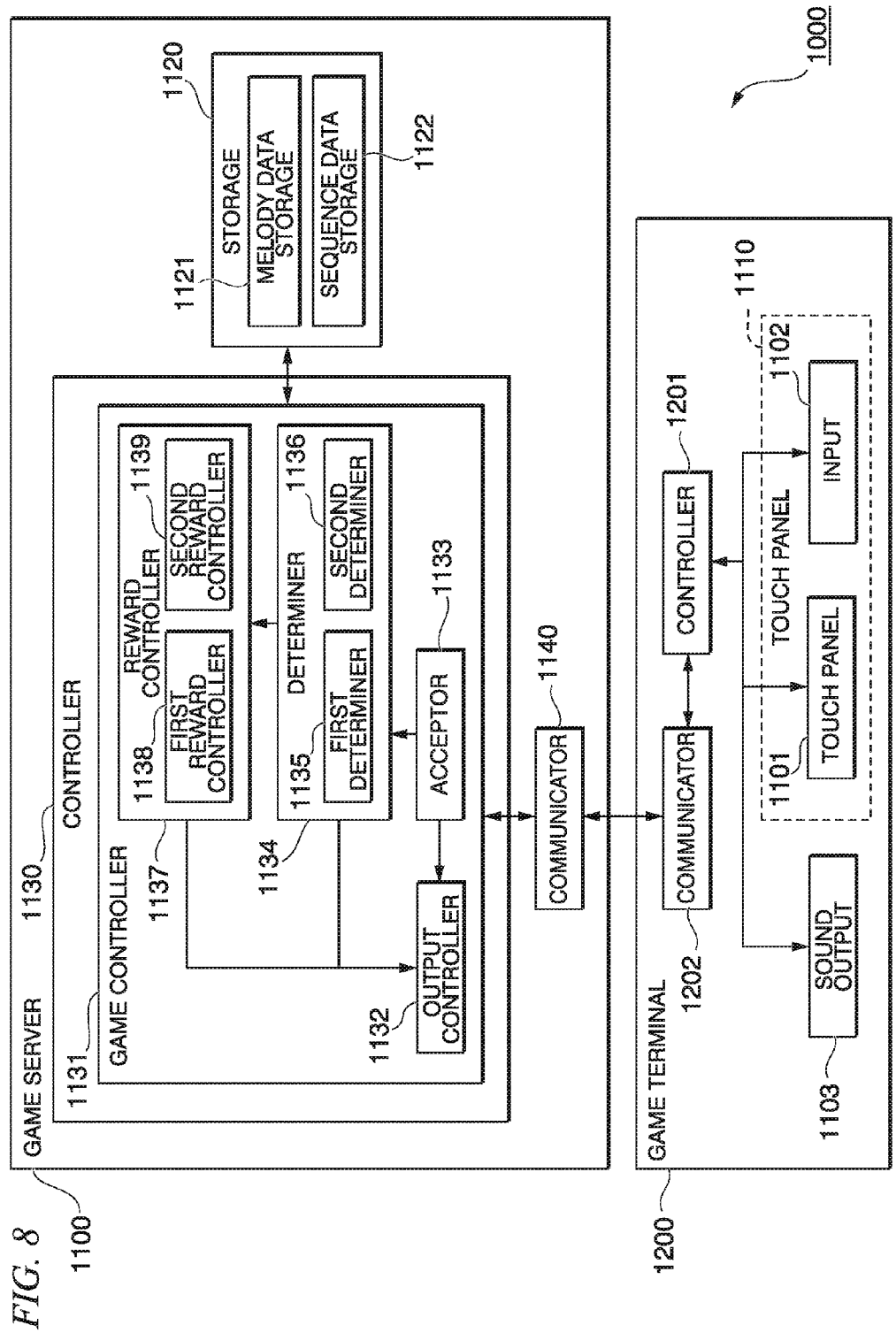
FIG. 8 shows an example of a constitution of a game system 1000, in which control processing is performed at a game server side and only input and output of information are performed at a game terminal side.

For example, FIG. 8 shows an example of a constitution of a game system 1000, in which control processing is performed at a game server side and only input and output of information are performed at a game terminal side.

The game system 1000 has a game server 1100 and a game terminal 1200, and the game server 1100 and the game terminal 1200 are connected via a network. The network is an information communication network constituted by the Internet, a WAN (wide area network), a LAN (local area network), a dedicated line, or a combination thereof.

The game server 1100 has a storage 1120, a controller 1130, and a communicator 1140.

The storage 1120 has a melody data storage 1121 and a sequence data storage 1122, the storage 1120, the melody data storage 1121, and the sequence data storage 1122 having the same constitutions as the storage 120, the melody data storage 121, and the sequence data storage 122 in the first embodiment.

The controller 1130 has a game controller 1131; the game controller 1131 has a output controller 1132, an acceptor 1133, a determiner 1134, and a reward controller 1137; the determiner 1134 has a first determiner 1135 and a second determiner 1136; and the reward controller 1137 has a first reward controller 1138 and a second reward controller 1139. The controller 1130, the game controller 1131, the output controller 1132, the acceptor 1133, the determiner 1134, the reward controller 1137, the first determiner 1135, the second determiner 1136, the first reward controller 1138, and the second reward controller 1139 have the same constitutions as the controller 130, the game controller 131, the output controller 132, the acceptor 133, the determiner 134, the reward controller 137, the first determiner 135, the second determiner 136, the first reward controller 138, and the second reward controller 139 in the first embodiment.

The communicator 1140 communicates with the game terminal 1200 via a network, receives an input signal generated in response to an operation made by the user with respect to the game terminal 1200, and transmits to the game terminal 1200 information output from the output controller 1132.

The game terminal 1200 has a display 1101 and an input 1102, and the display 1101 and the input 1102 constitute a touch panel 1110. The game terminal 1200 also has a sound output 1103, a controller 1201, and a communicator 1202.

The display 1101, the input 1102, the touch panel 1110, and the sound output 1103 have the same constitutions as the display 101, the input 102, the touch panel 110, and the sound output 103 in the first embodiment.

The controller 1201 controls the various parts of the game terminal 1200.

The communicator 1202 communicates with the game server 1100 via a network, transmits an input signal generated in response to an operation made by the user with respect to the input 1102, receives information transmitted from the game server 1100 and outputs it to the touch panel 1110 or the sound output 1103.

With this constitution as well, the same game as in the first to the third embodiments can be provided. Although this example shows one game terminal 1200 connected to the game server 1100, a plurality of game terminals 1200 can be connected to the game server 1100, and a game can be provided to each of the connected game terminals 1200.

In the above-described embodiments, although the example shown is the case in which, if the operation type is a flick, an object is moved so that flies in the flick direction, and the second success/failure determination judges whether or not the object collides with a target, other control may be performed. For example, a bubble game (bubble shooter game) may be run in which an object is moved in the flick direction. Alternatively, for example, a cannon shell can be fired in the flick direction to attach a target in a shooting game, and action can be done in an action game to attack an enemy.

In the above-described embodiments, although the description has been of an example in which user operations that are executed to match a first timing are made with respect to an object that has reached the determination circle a14 or a15, there is no restriction to the determination circles a14 and a15, and even if an operation is made in some area within the screen to match the first timing at which the object reaches the determination circles a14 or a15 that point in time when the operation is made may be controlled as the second timing.

In the above-described embodiments, although the example shown is one in which, if the object a13 is a burst object, the object a13 is flicked at the very end to throw it in the flick direction, the constitution may be such that control so that even a touching operation during a burst can be flicked to throw the object a13 and reward control by the second success/failure determination are performed.

Also, functionality may be provided which, for example, links to an SNS (social networking service), so as to display score rankings with other users who are friends in the SNS, and post messages to the SNS that include game results.

Also, for example, although in the first embodiment the example shown is one in which operation is done based on a game program that is installed beforehand in the game system 100 and stored in the storage 120, this may be a so-called browser-based game, in which a game program is received from a server or the like at the time the game is started and is then run.

In each of the above-described embodiments, although the example shown has been that of input of operations made on a touch panel are accepted, input may be accepted by operations made with respect to an input device such as a button of a game machine or arcade game machine.

The above-described character may be made changeable regarding the method of releasing objects, in accordance with some attribute of the user within the game or the items the user has. For example, it can be imagined that, if the character is feeling poorly, the release can be done so that the object describes a different parabola for each individual object as it moves on the screen, thereby increasing the difficulty of the timing game. In this case, control may be done so that, by using a prescribed item, the character can feel better, and throwing is done so that the parabola is constant. Alternatively, the difficulty can be changed by changing the speed of motion of the object.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A game program product, comprising: a non-transitory computer-readable medium, and a computer program stored in the non-transitory computer-readable medium, the computer program being, when executed by a computer of a game system including an acceptor configured to accept inputs by operations, to cause the computer to at least:
    make an output control to move at least one object displayed over a display screen toward a predefined area of the display screen;
    make, for each of the at least one object, a first success/failure determination, based on first and second timings, wherein at the first timing the object moving over the display screen reaches the predefined area of the display screen, and at the second timing the acceptor accepts the inputs;
    determine a first reward, based on the first success/failure determination based on the first and second timings;
    make, for each of the at least one object, a second success/failure determination, based on motions of the object, depending on a type of operation that the acceptor determined from the inputs that the acceptor has accepted, in a case that a result of the first success/failure determination represents success; and
    determine a second reward, based on the second success/failure determination depending on the type of operation.

2. The game program product according to claim 1, wherein the computer program is to cause the computer to further:
    display at least one target on the display screen;
    determine reward, on the basis of whether each of the at least object, which moved in a direction according to the inputs that the acceptor accepted at the second timing collides the at least one target, in a case that the result of the first success/failure determination represents success.

3. The game program product according to claim 1, wherein the output control comprises:
    displaying a game character releasing the at least one object on the display screen; and
    moving the at least one object released from the game character toward the predefined area of the display screen.

4. The game program product according to claim 1, wherein the game system comprises a sequence data storage that stores sequence data describing the first timing,
    wherein the at least one object is a plurality of objects, and
    wherein the output control comprises:
    determining, for each of the plurality of objects, the first timing on the basis of sequence data describing the first timing, where the first timing is in a period of time which is defined from a first time to a second time later than the first time;
        displaying, on the display screen, the plurality of objects, in correspondence with the first timing respectively determined for each of the plurality of objects;
        arranging, time-sequentially on a predefined route in the display screen, plural pairs of the object and a first time indicator, the first time indicator representing the predefined area of the display screen and corresponding to the first time; and
        for guiding the first timing, generating, on the predefined route, a relative displacement between the object and the first time indicator of each pair so that a distance between the object and the first time indicator of each pair decreases, depending on decreasing a time difference between the first time and the first timing respectively determined for each of the plurality of objects.

5. The game program product according to claim 1, wherein the computer program is to cause the computer to further:
    determine reward, on the basis of results of the first success/failure determination and the second success/failure determination.

6. The game program product according to claim 1, wherein the game system comprises a sequence data storage that stores sequence data describing the first timing,
    wherein the output control comprises:
    displaying the object that moves on a predefined route to an indicator so that the object reaches the indicator at the first timing in case that it is determined that it approaches the first timing which is described in the sequence data.

7. A game program product, comprising: a non-transitory computer-readable medium, and a computer program stored in the non-transitory computer-readable medium, the computer program being, when executed by a computer of a game system including an acceptor configured to accept inputs by operations, to cause the computer to at least:
    make, for each of at least one object, a first success/failure determination, based on first and second timings, wherein at the second timing the acceptor accepts the inputs;
    determine a first reward, based on the first success/failure determination based on the first and second timings;
    make, for each of the at least one object, a second success/failure determination, based on motions of the object, depending on a type of operation that the acceptor determined from the inputs that the acceptor has accepted, in a case that a result of the first success/failure determination represents success; and
    determine a second reward, based on the second success/failure determination depending on the type of operation.

8. A game program product, comprising: a non-transitory computer-readable medium, and a computer program stored in the non-transitory computer-readable medium, the computer program being, when executed by a computer, to cause the computer to at least:
    display, on a display screen of a touch panel, a game character releasing at least one object;
    move the at least one object to a predefined area of the display screen;
    make, for each of the at least one object, a success/failure determination, based on first and second timings, wherein at the first timing the object moving over the display screen reaches the predefined area of the display screen, and at the second timing the computer accepts input via the touch panel; and
    determine a first reward, based on the first success/failure determination based on the first and second timings;
    make, for each of the at least one object, a second success/failure determination, based on motions of the object, depending on a type of operation that the acceptor determined from the inputs that the acceptor has accepted, in a case that a result of the first success/failure determination represents success; and
    determine a second reward, based on the second success/failure determination depending on the type of operation.

* * * * *